3,413,137
METHOD OF MAKING INK-FILLED
TRANSFER ELEMENT
Paul Chebiniak, Binghamton, and Eugene R. Mondou,
Vestal, N.Y., assignors to International Business Machines Corporation, Armonk, N.Y., a corporation of New York
No Drawing. Filed Dec. 21, 1964, Ser. No. 420,107
10 Claims. (Cl. 117—36.1)

ABSTRACT OF THE DISCLOSURE

A porous, plastic transfer element containing a liquid marking material which is expressable from the pores of the element in response to pressure prepared by heating a dispersion in a liquid phase of about 30 parts by weight of a thermoplastic fluorocarbon resin, said liquid phase comprising from about 20 to about 50 parts by weight of a plasticizer which is a non-solvent for the plastic at room temperatures and is capable of solvating the plastic at elevated temperatures and from about 25 to about 60 parts by weight of a liquid marking material which is a non-solvent for said plastic to a temperature sufficient to fuse the plastic to form a continuous solid porous matrix in which the plasticizer is combined and the liquid marking material distributed in its pores so as to be expressable in response to pressure.

---

The present invention relates to improved, ink-filled transfer media and to methods for producing such materials. More specifically, the present invention relates to porous, plastic, ink-filled transfer media having longer service life.

In recent years, a number of new transfer media have been proposed which generally comprise a plastic matrix which contains droplets of ink which can be expressed from the plastic in response to pressure. Such materials find use as transfer ribbons for typewriters, chain printers and the like, as manifolding papers and in similar applications. However, a recurrent problem in the art has been the short service life of such materials.

Another difficulty with known, ink-filled porous plastic materials has been their lack of strength. Many such transfer materials are incapable of use as self-supporting elements. Others have such low shear strength that they are not satisfactory for use in certain applications, such as in ink rollers and the like.

Representative of available porous, plastic transfer materials are elements of the type disclosed in issued U.S. Patents 2,777,824, Harry R. Leeds, 2,893,890, E. N. Harvey, Jr., and 2,940,871, R. Smith-Johannsen.

Therefore, the primary object of the present invention is to provide improved, porous, plastic ink-filled transfer materials and a method for producing such materials. In particular, the invention is concerned with the production of improved porous, plastic transfer elements having increased service life and high shear strength.

The present invention comprises dispersing finely divided, crystalline, high molecular weight polyvinylidene fluoride in a high molecular weight liquid plasticizer, mixing the dispersion with a suitable solution or dispersion of a dye, pigment or other marking material, coating the resulting composition onto a substrate or otherwise forming it into the desired shape and then heating to fuse the plastic. The high molecular weight plasticizer essentially must be one which: (1) is substantially non-volatile, (2) is miscible with the marking fluid in all proportions, (3) acts essentially as a non-solvent for the resin particles at room temperatures and (4) is capable of solvating the polyvinylidene fluoride particles at elevated temperatures. The plasticizer is selected so that upon fusion of the plastic particles a major portion of it combines with and becomes incorporated into the solid, porous, plastic matrix, rather than remaining entrapped in the pores of the resin with the marking fluid. In one preferred embodiment of the invention, the plasticizer itself is a resinous material which increases in molecular weight or polymerizes during fusion of the polyvinylidene fluoride.

For an understanding of the nature of plasticizers as used in the present invention, reference may be had to "The Technology of Solvents and Plasticizers," Doolittle, pp. 864–866.

As discussed in Doolittle, the high molecular weight liquid plasticizer for the resin is a primary plasticizer and the ink vehicle is a secondary plasticizer. The primary plasticizer does not exude after fusion, while the secondary does exude. The primary plasticizer is essentially a solvent for the plastic, generally at elevated temperatures, but the secondary plasticizer is essentially a non-solvent.

The invention further comprises the products produced by this method which are elements consisting of solid, porous polyvinylidene fluoride matrix incorporating a plasticizer of the type described and containing droplets of ink which is expressible in response to pressure. The elements are characterized by unusually long service life and high strength.

The polyvinylidene fluoride powder used in the present invention is a crystalline, high molecular weight polymer containing about 59% by weight of fluorine. The crystalline melting point of the plastic is 340° F. A resin particle size of from about 1 to 100 microns in diameter and usually from about 30 to 50 microns is preferably employed. The molecular weight of the polymer may be in the range of from about 300,000 to 600,000.

While polyvinylidene fluoride is especially suitable in the present invention, other fluorocarbon thermoplastic resins may also be employed as the resin component, including, for example, polytetrafluoroethylene, fluorinated ethylene propylene and chlorotrifluoroethylene. These fluorocarbon resins are characterized by being substantially chemically inert, resistant to high and low temperatures, non-flammable, weather and oxidation resistant and having essentially zero moisture absorption and a low coefficient of friction.

The exact chemical composition of the high molecular weight liquid plasticizer in which the polyvinylidene fluoride is dispersed is not critical, but, as noted above, it must be miscible with the ink, have limited solubility for the resin at relatively low temperatures, i.e., at about room temperatures, but be able to solvate the resin particles at elevated temperatures.

According to one modification of the invention, the plasticizer selected may also be a resinous material which is converted by heat to a higher molecular weight or more highly polymerized form.

Various ink compositions may be used in the process. It is only necessary that the liquid ink vehicle not solvate the resin particles at room temperatures.

The polyvinylidene fluoride, plasticizer and ink composition may be formed into any desired shape by coating, casting, molding or other conventional processes. For example, the dispersion may be coated on any suitable substrate, including plastics, such as a Mylar film, fabric, paper or the like, and may then be cut and shaped to form ribbons, "carbon papers" and the like. The thickness of the dispersion coating is also not critical to the invention. It may vary from about a mil up to 10 or more mils in thickness. Thicker coatings have the advantage that they may be stripped off the substrate and used as independents, self-supporting transfer materials.

Fusing of the coating may be accomplished by any suitable heating procedure. Usually the composition is heated in an oven. For example, a coated web of substrate material may be continuously drawn through a heated oven, at a rate which will assure the proper heating period of fusion. The specific conditions of fusion are not critical, but as an example, fusion of a coated film of the dispersion may be satisfactorily accomplished by heating the film at a temperature of about 370° F. for about 40 seconds.

The resulting products comprise a porous matrix of fused particles of crystalline, high molecular weight polyvinylidene fluoride filled with a liquid ink or marking composition. As previously described, the elements may be self-supporting or may further comprise a suitable substrate or carrier.

As further modifications of the basic process, cross-linking agents may be incorporated into the mixture, so that the porous polymer matrix is cross-linked upon heating, thus adding to the strength of the product. The resin particles may also be dispersed in a heat-polymerizable monomer which will also effect cross-linking upon heating, again adding to the strength of the resulting article. As a further variation of the process, the composition may be foamed prior to coating by adding chemical blowing agents or by mechanically incorporating air into the mixture of polymer, plasticizer and ink. The addition of small amounts of porous materials, such as molecular sieves, porous polyethylene or the like, will also add to the ink holding capacity of the transfer material and will further increase the life of the product.

In addition to relatively thin manifolding papers and transfer ribbons, the present process may also be employed to cast articles of relatively large cross-section for use as stamp pads, ink rollers and related products.

In general, the transfer media of the present invention are produced by dispersing about 30 parts by weight of crystalline, high molecular weight polyvinylidene fluoride in from about 20 to 50 parts by weight of a high molecular weight liquid plasticizer which is substantially non-solvating to the polyvinylidene fluoride at room temperatures, but which solvates the resin particles at elevated temperatures near the fusion point of the plastic and which combines with the plastic matrix upon fusion. This dispersion is then mixed with from about 25 to 60 parts by weight of a marking fluid which essentially is a non-solvent for the polyvinylidene fluoride even at elevated temperatures, but which is compatible with the plasticizer. The marking fluid usually comprises a liquid vehicle containing dissolved or dispersed dyes or pigments. The composition is then coated as a film or layer on a substrate or is cast into any desired shape. Next, the material is heated to elevated temperatures to solvate the surface of the polyvinylidene fluoride particles and, in cases where a heat convertible plasticizer is used, to convert the plasticizer, thus producing a strong porous plastic, ink-filled transfer element.

As a specific example of the practice of the present invention, 30 parts by weight of crystalline, high molecular weight polyvinylidene fluoride commercially available as a powder under the tradename Kynar is mixed with 30 parts by weight of butylene glycol adipate and 30 parts by weight of a 40% dispersion of alkali blue in mineral oil. A small amount of di-basic lead phosphite stabilizer, about 2 parts by weight, is also added to the composition.

The composition is then mixed so that the polymer particles are fully dispersed and the composition is then applied as a coating about 3 mils thick on a web of Mylar film. The coated film is passed through an oven where it is heated at 370° F. for about 40 seconds. The resulting element is cut into ribbons and upon being subjected to "wear-down tests" is shown to have a life of over 100 lines, more than double the service life of conventional commercial transfer ribbons. The "wear-down tests" are conducted on a typewriter robot using a 4-line grid. Twenty consecutive columns of printing or characters are typed. The robot automatically indexes and returns to the original position. Typing is repeated over the same area of the sample transfer ribbon resulting in a typed pattern which is relatively dark at the top lines and gradually reduces in intensity on subsequently typed lines. This test provides an accurate and highly useful procedure for comparing the life of different typewriter ribbons or other transfer elements.

It will be understood that a wide variety of materials other than those specified in the above examples may be employed in the present invention. For example, in addition to butylene glycol adipate, the following organic liquids will function as suitable plasticizers and dispersants for the polyvinylidene fluoride: neopentyl glycol adipate, dimethyl phthalate, tributyl phosphate, tri-cresyl phosphate, tri-octyl phosphate, cresyl diphenyl phosphate, tributoxyethyl phosphate, etc.

Likewise, in addition to the marking liquid comprising a dispersion of alkali blue in mineral oil, other marking liquids may be employed in the invention. For example, alkali blue can also be used in castor oil, triethylene glycol, oleic acid. Some of the commercial black systems, such as DS 2183 (dye specialties), Black Base MP–87 (Sinclair Valentine), K–970 (Claremont Polychemicals Corp.), etc.

As noted in the example, it may be desirable to add a small amount of a stabilizer, as an optional ingredient. Suitable stabilizers include di-basic lead phosphite, any barium-cadmium type di-basic lead phthalate, normal lead salicylate, di-basic lead stearate.

Having described the process and products of the present invention with reference to certain preferred embodiment and detailed examples, it will be obvious to those skilled in the art that various modifications may be made in the disclosed procedures and materials without departing from the spirit of the invention as expressed in the following claims.

What is claimed is:

1. A process for producing a porous, plastic transfer element containing a liquid marking material which is expressible from the pores of the element in response to pressure comprising:

(A) forming a dispersion in a liquid phase of about 30 parts by weight of a particle of high molecular weight thermoplastic fluorocarbon plastic selected from the group consisting of polytertafluoroethylene, fluorinated ethylene propylene, chlorotrifluoroethylene and polyvinylidene fluoride, (1) said liquid phase comprising:

(a) from about 20 to 50 parts by weight of a substantially, non-volatile, high molecular weight liquid plasticized which is substantially a non-solvent for said plastic particles at room temperatures, and is capable of solvating said plastic at elevated temperatures, and (b) from about 25 to 60 parts by weight of a liquid marking material which is a non-solvent for said plastic even at elevated temperatures and which is miscible with said plasticizer in all proportions, and (B) heating said dispersion to fuse said particles of plastic to form a continuous, solid, porous matrix in which said plasticizer is combined, said matrix having said liquid marking material distributed in its pores so as to be expressible in response to pressure.

2. A process for producing a porous, plastic transfer element containing a liquid marking material which is expressible from the pores of the element in response to pressure comprising:

(A) forming a dispersion of about 30 parts by weight of crystalline high molecular weight polyvinylidene fluoride plastic particles in a liquid phase, (1) said liquid phase comprising:

(a) from about 20 to 50 parts by weight of a substantially, non-volatile, high molecular weight liquid plasticizer which is substantially a non-solvent for said plastic particles at room temperatures, and is capable of solvating said plastic at elevated temperatures, and (b) from about 25 to 60 parts by weight of a liquid marking material which is a non-solvent for said plastic even at elevated temperatures and which is miscible with said plasticizer in all proportions, and (B) heating said dispersion to fuse said particles of plastic to form a continuous, solid, porous matrix in which said plasticizer is combined, said matrix having said liquid marking material distributed in it pores so as to be expressible in response to pressure.

3. The process of claim 2 wherein said polyvinylidene fluoride has a molecular weight in the range of from about 300,000 to 600,000.

4. The process of claim 2 wherein said plasticizer is a resinous material which increases in molecular weight and is combined into said matrix upon being heated to the fusion temperature of said plastic.

5. The process of claim 2 wherein said plasticizer is butylene glycol adipate.

6. The process of claim 2 wherein said liquid marking material is a dispersion of alkali blue in mineral oil.

7. A process for producing a porous, plastic transfer element material containing a liquid marking material which is expressible from the pores in response to pressure comprising:

(A) forming a dispersion of about 30 parts by weight of crystalline high molecular weight polyvinylidene fluoride plastic particles in a liquid phase, (1) said liquid phase comprising:

(a) from about 20 to 50 parts by weight of a substantially, non-volatile, high molecular weight liquid plasticizer which is substantially a non-solvent for said plastic particles at room temperatures, but is capable of solvating said plastic at elevated temperatures, and (b) from about 25 to 60 parts by weight of a liquid marking material which is a non-solvent for said plastic even at elevated temperatures, and which is miscible with said plasticizer in all proportions, (B) coating said dispersion onto a substrate, and (C) heating said dispersion to fuse said particles of plastic to form a continuous, solid, porous matrix in which said plasticizer is combined, said matrix having said liquid marking material distributed in its pores so as to be expressible in response to pressure.

8. The process of claim 7 wherein said plasticizer is a resinous material which increases in molecular weight and is combined into said matrix upon being heated to the fusion temperature of said plastic.

9. The process of claim 7 wherein said liquid marking material is a dispersion of alkali blue in mineral oil.

10. The process of claim 7 further comprising the step of stripping said matrix containing said liquid marking material distributed in its pores from said substrate to form an independent, self-supporting element.

References Cited

UNITED STATES PATENTS

| 2,893,890 | 7/1959 | Harvey | 117—36.1 |
|---|---|---|---|
| 2,989,493 | 6/1961 | Clark et al. | 117—36.1 |
| 3,055,297 | 9/1962 | Leeds | 117—36.1 |
| 3,303,046 | 2/1967 | Chebiniak | 117—36.1 |

MURRAY KATZ, *Primary Examiner.*